J. F. LANGDON.
BAND CUTTER AND FEEDER.
APPLICATION FILED APR. 17, 1911.
1,136,966.
Patented Apr. 27, 1915.
4 SHEETS—SHEET 1.
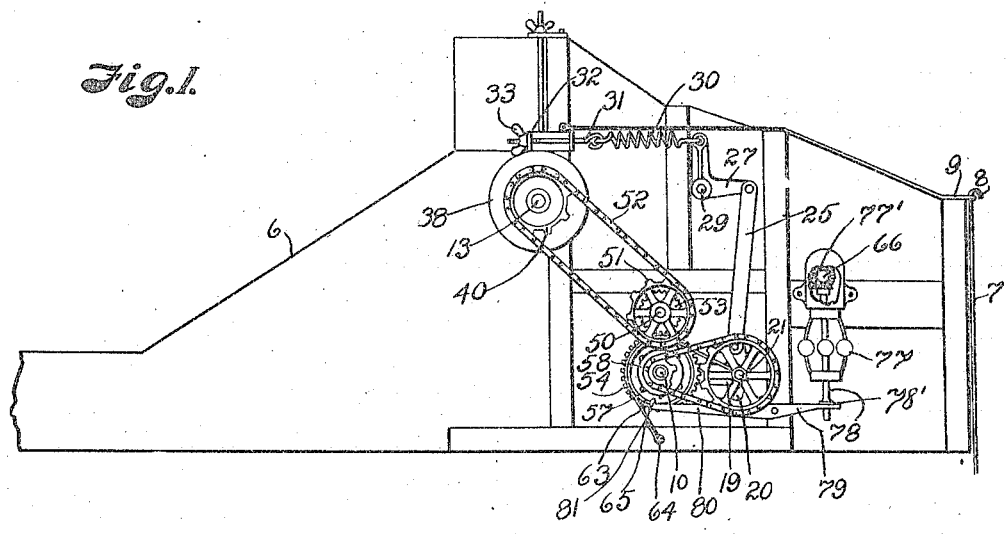
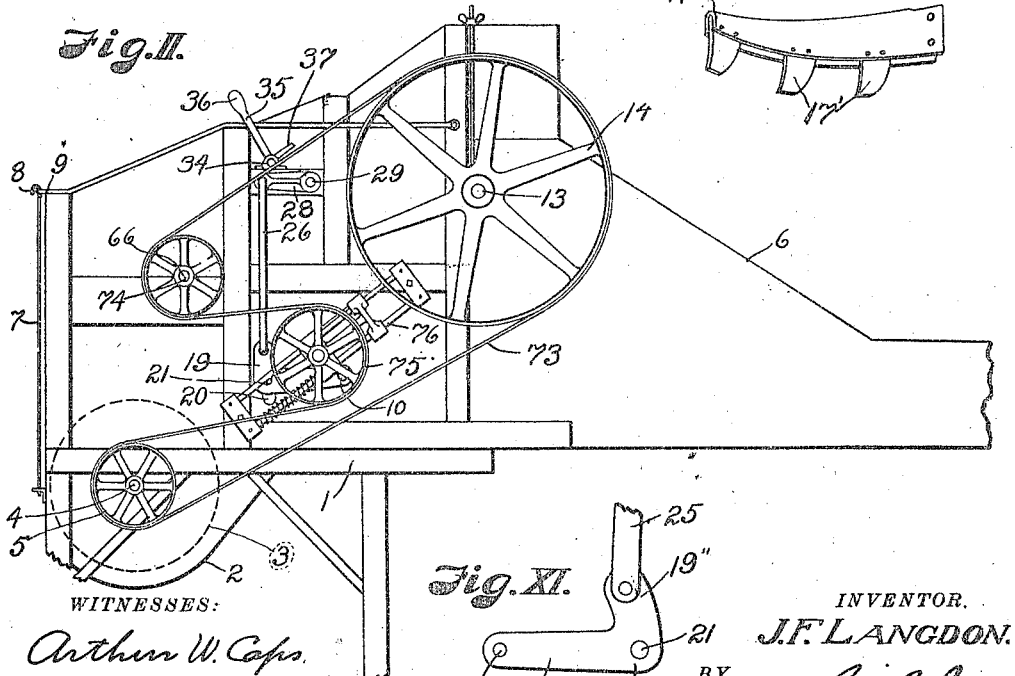
WITNESSES:
INVENTOR,
J. F. LANGDON.
BY
ATTORNEY.

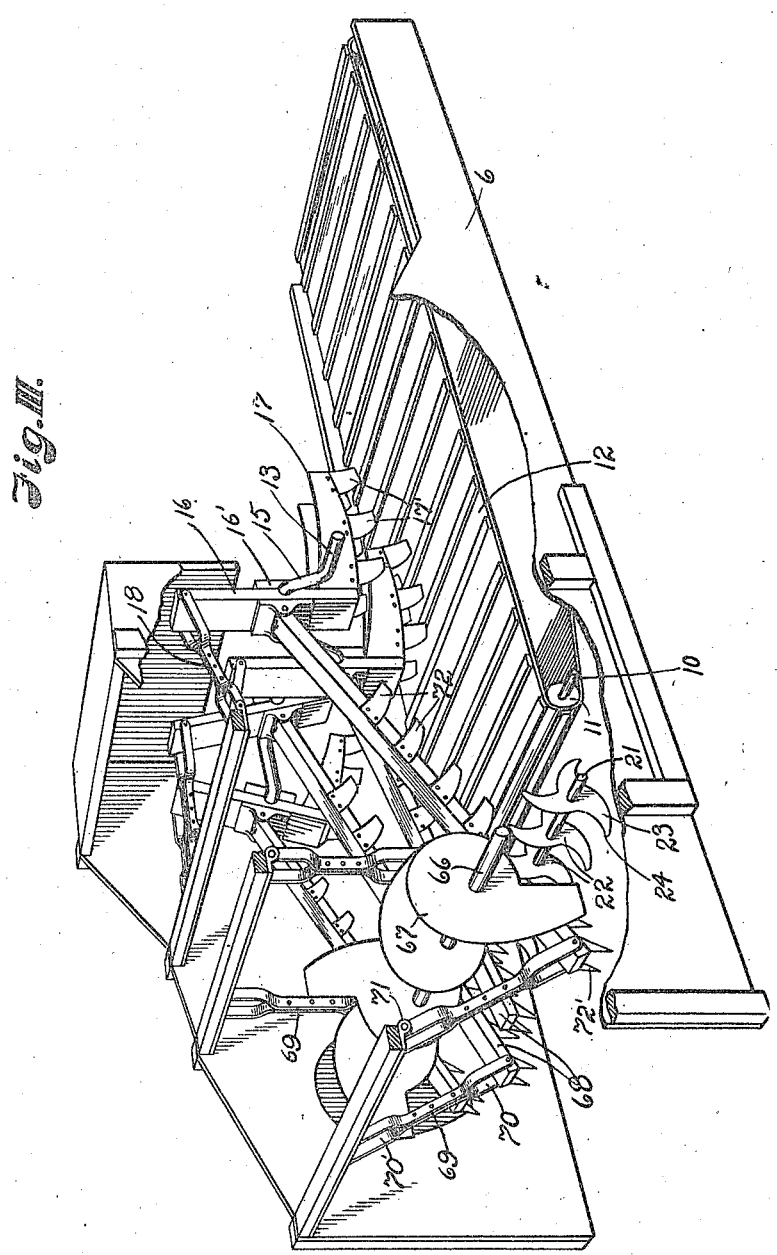

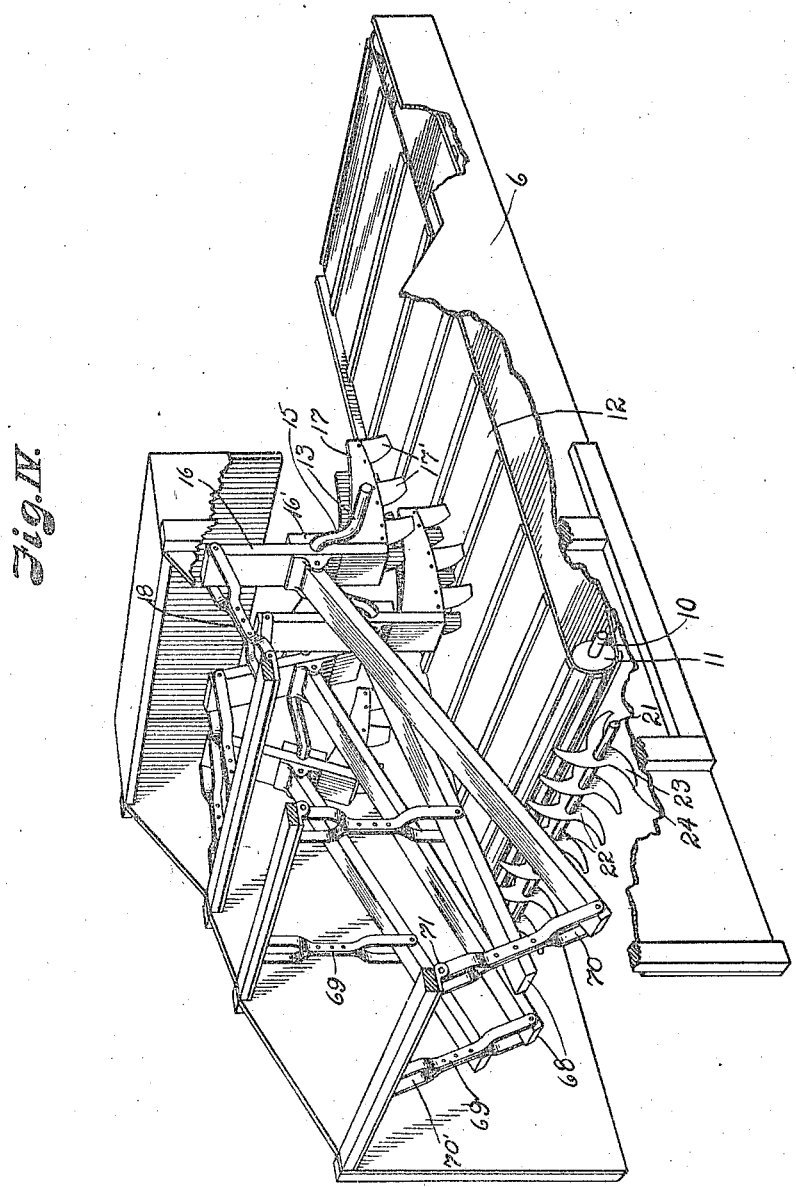

J. F. LANGDON.
BAND CUTTER AND FEEDER.
APPLICATION FILED APR. 17, 1911.
1,136,966.
Patented Apr. 27, 1915.
4 SHEETS—SHEET 4.
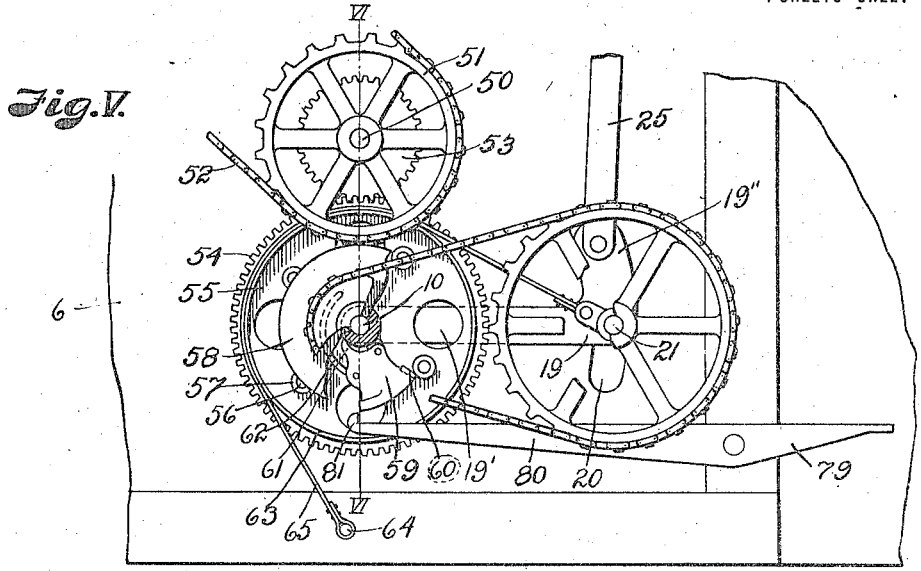
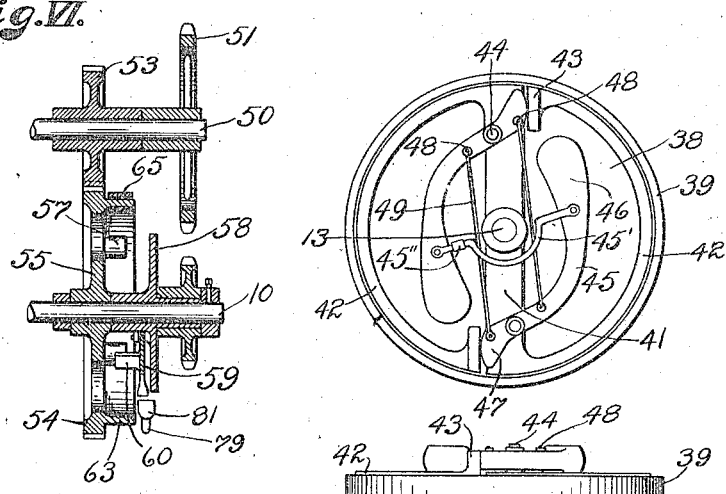
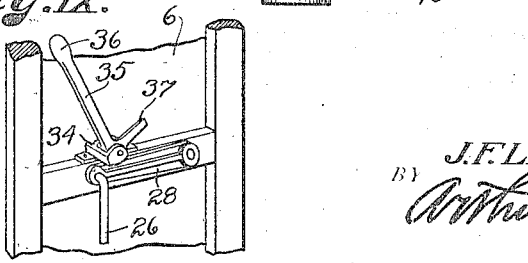
WITNESSES:
Arthur W. Capps
Myrtle M. Jackson
INVENTOR.
J. F. LANGDON.
BY
ATTORNEY.

UNITED STATES PATENT OFFICE.

JOHN F. LANGDON, OF KANSAS CITY, KANSAS.

BAND-CUTTER AND FEEDER.

1,136,966.    Specification of Letters Patent.    Patented Apr. 27, 1915.

Application filed April 17, 1911. Serial No. 621,499.

*To all whom it may concern:*

Be it known that I, JOHN F. LANGDON, a citizen of the United States, residing at Kansas City, in the county of Wyandotte and State of Kansas, have invented certain new and useful Improvements in Band-Cutters and Feeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to feeders for threshing machines, clover hullers, alfalfa mills and the like, and has for its principal object to provide reciprocatory parts for cutting the bands of sheaves delivered thereto and feeding same to a threshing or other machine.

It is a further object of my invention to provide means for driving the feeder from the threshing mechanism, and a governor controlled clutch for forming a driving connection for the feeder only when the main machine is traveling at threshing speed.

It is a further object of my invention to provide means for operating the clutch whereby the operation of the feeder may be automatically stopped, should the machine become clogged, without interrupting the operation of the cutter or the speed of the threshing cylinder.

It is a further object of my invention to provide the improved details of construction, hereinafter described and illustrated in the accompanying drawings, in which:—

Figure I is a side view of a self-feeder constructed in accordance with my invention. Fig. II is a similar view of the opposite side. Fig. III is a perspective view of the operative parts of my improved feeder, showing the feeding and band cutting knives and cutting cams, the retarder, and the pressure bars. Fig. IV is a similar view, with the cutting cams removed and showing plain pressure bars; an economical construction which is, in some respects, preferable to the more elaborate structure. Fig. V is an enlarged detail view of a part of the driving mechanism, the fixed disk on the conveyer shaft being broken away to show the clutch connection between same and the loose gear. Fig. VI is a vertical section on the line VI—VI, Fig. V. Fig. VII is an enlarged side view of the driving drum and governor on the band cutter shaft. Fig. VIII is a plan view of same. Fig. IX is a detail view of a lever for throwing the emergency clutch. Fig. X is a detail view of one of the band cutter blades. Fig. XI is a detail view of one of the bell crank levers for carrying the retarder shaft.

Referring more in detail to the parts:—1 designates the frame of the threshing machine, which may be of any ordinary or suitable construction adapted for carrying a feeder, and having the usual concave 2 and threshing cylinder 3, the latter being fixed on a shaft 4 which is journaled in the sides of the machine frame and provided with an exterior pulley wheel 5.

Mounted on the machine frame is a feeder casing 6, the inner end of which is located above the threshing cylinder 3 and the outer end preferably projected beyond the end of the machine, the casing being anchored to the machine by links 7, having hooked ends 8 adapted to take into eyelets 9 that project from the inner end of the feeder casing.

Journaled in the sides of casing 6 is a shaft 10, and fixed to the shaft within the casing is a roller 11, over which the conveyer belt 12 is adapted to travel.

Journaled in the sides of casing 6, over the inner end of the conveyer 12 is a cranked shaft 13, one end of which extends through the casing 6 and carries a belt wheel 14, by which the feeder is operated from the threshing cylinder, as will presently be described. Within the casing, shaft 13 is provided with a plurality of elbows 15, each of which carries a boxing 16—16', the member 16 of which is extended both above and below the path of the shaft.

Mounted on the lower end of each of members 16, is a knife 17 which extends forwardly over the conveyer and is preferably channeled to receive the shanks of individual blades 17' which are riveted to the bodies 17 and have rearwardly facing, curved, cutting edges.

18 designates links which are pivotally mounted on a part of the casing 6, at the rear of the crank shaft, and are pivotally connected at their forward ends with the upper parts of the boxing members 16, so that when the crank shaft is revolved to reciprocate the band cutting knives, the links 18 will turn the boxings on the cranks to produce an up and down movement thereof, the combined action producing an elliptical travel of the knives, so that they may be lifted over an incoming sheaf on their forward movement, and move downwardly, during their backward movement to engage and cut the bands of the sheaves carried on the conveyer.

Revolubly mounted on each end of shaft 10, on the exterior of the casing, is the forward arm 19' of a bell crank lever 19, the rear end 19" of which is turned upwardly as illustrated in Fig. V. In each side of casing 6, adjacent to the rear arm of lever 19, is an arcuatile slot 20.

Journaled in the elbows of the levers 19, and extended through said slots and through the interior of the casing, is a shaft 21, upon which are mounted a plurality of retarding members 22, comprising spiral blades 23.

The retarder shaft is yieldingly suspended in the feeder by means of the hangers 25—26, which are pivotally connected at their lower ends with the bell cranks 19 and at their upper ends with bell crank levers 27, 28, which are fixed on a rock shaft 29 that is journaled in and extends entirely through the casing 6. The link 27 is bell cranked, and connected with the arm thereof opposite the hanger 25 is a spring 30, which is anchored to a bolt 31 that extends through eyelets 32 on the casing and is provided with a wing nut 33 by which the tension of the spring may be regulated, to adapt the retarder for work according to the condition of the straw that is fed through the feeder.

Pivotally mounted in a bearing 34 that is mounted on the casing above the link 28, is a lever 35, having a handle portion 36 and a foot 37, which latter is adapted for engagement with the link 28 to lower the retarder against the tension of the spring 30 and stop the feeder mechanism, as will presently be described.

Revolubly mounted on the cranked band cutter shaft 13, is a wheel 38, having a laterally directed, peripheral flange 39 at one side. Fixed to the hub of wheel 38 at the side opposite the flange is a sprocket 40. Fixed to shaft 13 at the flanged side of wheel 38 is a bar 41, having spring arms 42 at its ends, which lie immediately within, but are normally spaced from the flange 39, one end of each arm being connected with the bar and the other being free and provided with a laterally directed head 43. Near each end of bar 41 is a post 44, and pivotally mounted on each post is a governor arm 45, having a weighted body 46 at one end, and a foot 47 at the opposite end in engagement with the head 43 of a spring arm 42.

On each governor arm, at opposite sides of the post 44, are pins 48, and pivotally mounted on the pins and connecting said governor arms are the links 49, through which the governor arms are united to insure concerted action. With this mechanism, the governor and spring arms will revolve idly with the crank shaft until sufficient speed of the shaft has been attained to throw the governor arms out against the spring arms with force enough to cause the spring arms to engage and hold against the flange 39, when the wheel will be revolved.

I prefer to provide the governor arms with a latch 45' for holding the arms in their spread position, in which they hold the spring arms firmly against the inner face of flange 42 and form a permanent clutch therebetween. The latch may be formed in two parts, each of which may be screwed to one of the arms, and the separate parts connected by a turnbuckle 45", by which the arms may be spread.

It is apparent that with the latch in place a permanent driving connection is formed between the shaft 13 and wheel 38, and a permanent transmission between the cutting and feeding parts, except for an emergency release, which will presently be described.

Mounted on the feeder casing is a shaft 50. Fixed on shaft 50, is a sprocket 51, having connection with the friction drive sprocket 40, through a belt 52. Also fixed on shaft 50 is a gear wheel 53 which meshes with the gear 54 on a wheel 55 that is revolubly mounted on the conveyer shaft 10. On the outer face of wheel 55 are a number of posts 56, carrying rollers 57.

Fixed on shaft 10 is a disk 58. Pivoted to disk 58 is a dog 59, having an ear 60 extending inwardly into position for engagement with the rollers 57, and having a tongue 61 adapted for engagement with the hub of the disk, so that when the dog is engaged by one of the rollers the tongue will bind against the hub and a driving connection to be formed between the fixed disk and loose gear.

62 designates a spring which normally yieldingly retains the dog in its connecting position.

On the face of wheel 55 is a flange 63. Permanently mounted, at one end, on a post 64 on the casing 6, is a strap 65, which is passed over the flange 63 and is connected at its opposite end, with the retarder shaft 21, so that when the shaft is lowered the strap will act on the brake band to stop the revolution of the feeder by retarding the travel of wheel 38 on the cutter shaft 13, so that the spring arms will slide therein.

While their use is not essential to the machine, I prefer, in some cases, to provide the feeder with auxiliary cutting knives. With this construction I journal a shaft 66 in the sides of the casing above and to the rear of the retarder shaft 21. Fixed to shaft 66 are a number of cam shaped knives 67, which are staggered in arrangement and may, if desired, be made to intermesh with the retarder fingers, although such arrangement is not essential.

Hinged to each of the boxing members 16 that supports a forward band cutter knife, is a pressure bar 68, which extends backwardly and downwardly above the retarders and is pivotally supported by hangers 69, preferably comprising double straps having yokes 70 at their lower ends pivotally connected with the rear ends to the bars, and yokes 70' at their forward ends pivotally connected with eye members 71 on the top of the casing. When the cam knives are used, the pressure bars may be extended therebetween as illustrated in Fig. IV.

Bars 68 serve to guide the material from the conveyer over the retarder and into the threshing concave, and are set sufficiently close to the retarder, so that should an uncut sheaf or mass of grain, large enough to clog the cylinder, pass the band cutting knives, the mass will bind between same and the retarder and stop the machinery without damage, until the mass can be broken up to free the parts. These bars also serve to assist in guiding and stiffening the action of the band cutting knives and may be provided with the blades 72—72', the former having rearwardly facing cutting edges adapted to cut the band of a sheaf which may have passed unsevered beneath the forward band cutters and to chop the material on the backward travel of the bars, and the blades 72' having forwardly facing cutting edges adapted for serving the same purpose on the forward travel of the bars, and also for back feeding and guiding material into the threshing concave.

The feeder may be operated from the threshing cylinder by means of a belt 73 (Fig. II) which is run over the pulley 5 on the cylinder shaft 4, the pulley 14 on the crank shaft 13, a pulley 74 which may be mounted on a shaft which, when the cam knives are used may be the shaft 66 and thereby obviate the necessity of providing special gearing for actuating the knives, and preferably, over pulley 75 on a belt tightener 76 of any ordinary construction, so that the feeder is operated simultaneously with the operation of the main machine.

When the cam knives 67 are used, I provide an emergency trip for stopping the conveyer, comprising a governor 77, having geared connection 77' with the knife shaft 66, so that when the knife shaft is traveling, the governor will lift a rod 78. Pivotally mounted below the governor rod is a lever 79, one arm 80 of which has a hook 81 thereon adapted for engagement with the dog 59 on the disk 58, and an arm 81 projected beneath the governor 77 and provided with an aperture through which the governor rod 78 is loosely projected. On rod 78 is a collar 78' which rests on the arm 81 and limits the projection of the rod therethrough.

Presuming the parts to be constructed and assembled as described, the threshing machine is started and the revolution of the threshing cylinder transmits motion to the crank shaft and, when the rear cam knives are used, to the cam shaft, through the belt 73, rotary motion of the crank shaft being transposed into partly reciprocal motion of the knives, owing to the character of their mounting. When the band cutter knives are actuated, the pressure bars 68 are reciprocated over a part of the conveyer and over the retarder.

During the initial operation of the threshing machine, the conveyer is inoperative, but as soon as the threshing cylinder is operated at a predetermined speed, the revolution of the crank shaft will generate sufficient centrifugal force to throw the governor weights 46 outwardly so that the feet 47 will engage the heads on the spring arms 42 and force said arms against the flange of wheel 38, forming a friction clutch through which the wheel is revolved. Sprocket 40, being fixed to wheel 38 is revolved therewith and revolves the loose gear wheel 55 on the conveyer shaft, through the chain belt and gearing heretofore described. With the governor arm latch in use, the wheel 38 will revolve with the shaft independent of the rate of travel of the latter and as though the wheel were fixed rigidly on the shaft. When the loose wheel is revolved one of the rollers 57 engages the dog 59 on the disk that is fixed to the conveyer shaft, so that the conveyer is actuated thereby, the revolution of the conveyer serving to revolve the retarder, through the chain and sprocket connection therebetween. With these parts in operation, sheaves fed to the conveyer are carried beneath the reciprocatory knives, where the bands are cut and the straw spread so that it can be moved back to the threshing cylinder, the reciprocatory bars assisting in the backward travel and confining the straw over the retarder so as to limit the quantity delivered to the cylinder.

Should too great a mass of material be delivered to the cutting knives it will clog between the knives and conveyer, so that the pressure on the conveyer will act as a brake on the transmission, which, overcoming the frictional clutch will alow the wheel 38 to slip on the spring arm. The conveyer is stopped when the clutch slips, so that no more grain is fed into the cutter, but the reciprocatory knives continue to work, and the material is raked off of the conveyer into the thresher. As soon as the mass is broken up and partially distributed, the strain is relieved, and the work of the carrier is resumed.

Should too great a quantity of material be passed between the knives and clog between the pressure bars and retarder, the pressure on the retarder will lower the same against the tension of the spring 30, so that the strap 65 will be tightened on the band of the loose wheel 55 and the conveyer stopped, until the mass is broken up and partially raked off.

When a long tangled mass of material, such as rye, passes into the concave it is sometimes held by the retarder. As the threshing cylinder is traveling much faster than the retarder, there is a tendency to jerk the retarder down, the mass being held by the retarder fingers. When the retarder is jerked downwardly the governor is actuated to stop the feeder until the threshing cylinder has combed out the mass and the resistance of the springs has been overcome, so that the retarder will automatically lift. The feeding operation is then continued.

When the cam knives are used, material clogging between the cams and retarder will slacken the travel of the cams so that the governor 77 will straighten and rock the lever arm 80 into engagement with the dog 59, thereby holding the dog and causing it to rock back out of the path of the rollers 57 to free the loose gear wheel, and break the connection between the initial drivers and the conveyer, or should the cam driving belt hold the shaft against slippage, so that the speed could not be slackened, the retarder will be moved down by the mass of material and act as described with reference to the pressure bars.

Should the operator wish to stop the feeder immediately, without waiting to call instructions to the operator of the main machine, the hand lever may be operated to lower the retarder and brake the retarder gear, in the same manner as this operation is performed automatically when the machine is clogged.

It is apparent that with the devices described, there is little danger of damage to the machine, due to clogging or overfeeding, and that while it may be driven directly from the main machines, its control is independent thereof and to a great extent automatic.

Having thus described my invention, what I claim as new therein and desire to secure by Letters-Patent is:—

1. In a feeder, the combination with a band-cutter and a conveyer, of driving mechanism, clutch mechanism for driving the conveyer from the driving mechanism, a retarder, means operable by the retarder for controlling said clutch mechanism, and means movable toward and from the retarder for pressing material against the retarder after delivery of the material from the conveyer, whereby action of the retarder is governed by the condition of grain passing thereover.

2. In a feeder, the combination with a band cutter and a conveyer, of driving mechanism, clutch mechanism for driving the conveyer from the driving mechanism, an adjustable retarder, means operable by the retarder for controlling said clutch mechanism, and means movable toward and from the retarder for pressing material against the retarder, after delivery of the material from the conveyer, whereby action of the retarder is governed by the condition of grain passing thereover.

3. In a feeder, the combination with an automatically adjustable retarder, of a conveyer adapted for delivering material over the retarder, means movable toward and from the retarder for thrusting a mass of material delivered by the conveyer against the retarder, and means controllable by the retarder for actuating the conveyer whereby travel of the conveyer is influenced by position of the retarder.

4. In a feeder, the combination with a conveyer, of driving mechanism, clutch mechanism for actuating the conveyer from the driving mechanism, an automatically adjustable retarder onto which material is delivered by the conveyer, vertically movable means adapted for projection into a mass of material carried by the retarder, and means operably connected with the retarder for controlling said clutch mechanism.

5. In a feeder, the combination with an automatically adjustable retarder, of a conveyer adapted for delivering material onto the retarder, means adapted for movement over the retarder, and having members adapted for projection into a mass of material overlying the retarder, in the direction of travel of said means, and whereby the retarder is automatically adjusted, means for actuating the conveyer, and means operable by the retarder for controlling said actuating means.

6. In a feeder the combination with a driving member, of a conveyer, means normally operatively connecting the driving member with the conveyer, an automatically adjustable retarder, means operable by the retarder for stopping said conveyer, and means operable independently of the conveyer and retarder for combing material from the retarder.

7. In a feeder the combination with a driving member, of a conveyer, means normally operatively connecting the driving member and conveyer, an automatically adjustable retarder, means operable from the conveyer for actuating the retarder, means operable by the retarder for stopping the conveyer, and means operable independently of the conveyer and retarder for combing material from the retarder when the conveyer and retarder are idle.

8. In a feeder the combination with a driving member, of a conveyer, means normally operably connecting the driving member and conveyer, an automatically adjustable retarder adapted for revoluble travel, means for operating the retarder from the conveyer, and means operable independently of the conveyer and in the line of feed for combing material from the retarder when travel of the retarder and conveyer is stopped.

9. In a feeder, the combination with a conveyer and a band cutter, of yielding means for supporting a retarder and a retarder supported by said means, an oscillating knife bar extended over the retarder and adapted for travel in the line of feed and for positively pressing an overcharge of material thereagainst to lower same against its yielding support, and mechanism connecting the conveyer and retarder whereby the travel of the former is interrupted when the latter is lowered, for the purpose set forth.

10. In a feeder, the combination with a conveyer and a band cutter, of yielding conveyer and a band cutter, of yielding means for supporting a retarder and a retarder supported by said means, an oscillating knife bar extended over the retarder and adapted for travel in the direction of the feed and for positively pressing an overcharge of material thereagainst to lower same against its yielding support, and mechanism connecting the conveyer and retarder whereby the travel of the former is interrupted when the latter is lowered, for the purpose set forth.

11. In a feeder, the combination with a conveyer, of a cranked band cutter shaft, band cutters comprising upright members pivotally mounted on cranked parts of the shaft and having forwardly directed knives on their lower ends, links pivotally connecting upper ends of the uprights with a stationary part of the feeder to impart oscillating movement to the knives when the crank is actuated, a spring supported retarder, mechanism for stopping the conveyer when the retarder is lowered, and oscillating knife bars located over the retarder with their forward ends pivotally connected with the cutter uprights and their rear ends pivotally suspended from a stationary part, the supports for said bars being rigid to positively press an overcharge of grain against the retarder, for the purpose set forth.

12. In a feeder, the combination with a conveyer, of an automatically adjustable retarder, a driving member, means normally operatively connecting the driving member and conveyer and adapted for automatic disconnection from said driving member, and a brake operable by the retarder and connected with the conveyer whereby the conveyer is retarded and said normally operative means disconnected from its driving member.

13. In a feeder, the combination with a conveyer, of an automatically adjustable retarder, a driving member, means normally operatively connecting the driving member and conveyer and adapted for governable disconnection from said driving member, a brake flange connected with the conveyer, and a strap operable by the retarder and adapted for frictional engagement with the flange whereby the conveyer is retarded and said normally operative means disconnected from its driving member.

14. In a feeder, the combination with a band cutter, and means for actuating same, of a conveyer, an automatically adjustable retarder operable from the conveyer, a driving member, means normally operatively connecting the driving member and conveyer and adapted for governable disconnection from said member, means operable from the retarder for holding the conveyer, and means operable independently of the conveyer and retarder for combing material from the conveyer and retarder when the conveyer is held.

15. In a feeder, the combination with a conveyer, of a crank shaft, a vertically arranged member revolubly mounted on the cranked part of said shaft, a link connected with said member above the mounting and pivotally connected with a stationary portion of the feeder, a relatively horizontal pressure bar pivotally connected with said member and extending backwardly and downwardly therefrom, and a suspending link pivotally mounted on the feeder and pivotally connected with said pressure bar.

16. The combination in a feeder, of a conveyer, a retarder, a crank shaft, a vertically arranged member pivotally mounted on a cranked part of said shaft and extending above and below its mounting, a knife fixed to the lower end of said member and extending forwardly over the conveyer, a link pivotally connected with the upper end of said member and extending rearwardly therefrom, the rear end of said link being pivotally mounted on a stationary portion of the feeder, a relatively horizontal pressure bar having its forward end pivotally mounted on said member, at the back of the member mounting, and extending rearwardly over the retarder, and a link pivotally connected with said pressure bar and with a stationary portion of the feeder.

17. In a feeder, the combination with a band cutter and a conveyer, of automatically yieldable supports, a retarder carried by said supports and extending across the machine at the end of the conveyer, mechanism for driving the conveyer and retarder, means operable upon the lowering of said retarder for interrupting the driving action of said mechanism, and a pressure member adapted for travel in a fixed path over the retarder, and for positively pressing an overcharge of material thereagainst, for the purpose set forth.

18. In a feeder, the combination with a band cutter having a suitable shaft, of a revoluble retarder adapted for automatic vertical adjustment, means for normally yieldingly retaining said retarder at the upper limit of its travel, a conveyer having its driving shaft adjacent said retarder, a driven member on said shaft having operative connection with the retarder, a driving member on the conveyer shaft adapted for operative connection with the driven member and provided with a brake flange, a strap run over said flange and having one end fixed and the other end connected with the retarder, whereby said strap is tightened on the flange when the retarder is lowered, and a friction drive member on the band cutter shaft operatively connected with the driving member on the conveyer shaft and adapted to slip to render the conveyer and retarder inoperative when the retarder is lowered, without interrupting the travel of the band cutter, substantially as set forth.

19. In a feeder, the combination with a cutter, of a conveyer having a suitable shaft, a gear wheel loose on said shaft, and provided with laterally disposed posts, a disk fixed on said shaft, having a dog pivotally mounted thereon and adapted engagement by said posts, a sprocket wheel fixed on said shaft, a retarder having a shaft adapted for automatic vertical adjustment, a sprocket wheel on said retarded shaft having chain connection with the sprocket wheel on said conveyer shaft, a pressure device located adjacent the retarder, a lever adapted for actuating said dog, and a governor mechanism adapted for actuation by said retarder and for actuating said lever, substantially as and for the purpose set forth.

In testimony whereof I affix my signature in presence of two witnesses.

JOHN F. LANGDON.

Witnesses:
MYRTLE M. JACKSON,
ARTHUR W. CAPS.